US012544294B2

(12) United States Patent
Downes

(10) Patent No.: US 12,544,294 B2
(45) Date of Patent: Feb. 10, 2026

(54) BREAKAWAY WALKER TRAY

(71) Applicant: Candece Downes, Van Nuys, CA (US)

(72) Inventor: Candece Downes, Van Nuys, CA (US)

(*) Notice: Subject to any disclaimer, the term of this patent is extended or adjusted under 35 U.S.C. 154(b) by 997 days.

(21) Appl. No.: 17/105,964

(22) Filed: Nov. 27, 2020

(65) Prior Publication Data

US 2021/0154083 A1 May 27, 2021

Related U.S. Application Data

(60) Provisional application No. 62/940,443, filed on Nov. 26, 2019.

(51) Int. Cl.
*A61H 3/00* (2006.01)

(52) U.S. Cl.
CPC ......... *A61H 3/00* (2013.01); *A61H 2003/004* (2013.01)

(58) Field of Classification Search
CPC ........ A61H 3/00
USPC ........ 224/407
See application file for complete search history.

(56) References Cited

U.S. PATENT DOCUMENTS 4,074,683 A * 2/1978 Di Chiara ........ A61H 3/00 211/164
4,452,484 A * 6/1984 Pastor ........ A61H 3/00 297/150
4,534,469 A * 8/1985 Elsmo ........ A47G 19/06 206/217
4,708,274 A * 11/1987 Roche ........ A61H 3/00 224/407
4,830,243 A * 5/1989 Mann ........ A61H 3/00 108/88
D301,820 S * 6/1989 Wasserman ........ D7/552.2
4,850,641 A * 7/1989 Walker ........ A61H 3/00 224/407
D305,015 S * 12/1989 Roche ........ D6/406.3
4,907,839 A * 3/1990 Rose ........ A61H 3/00 297/334

(Continued)

FOREIGN PATENT DOCUMENTS

GB 2476247 B * 11/2011 ........ A61H 3/04

OTHER PUBLICATIONS

GB-2476247-B; "Patient Walking Trolley Has Trays Which Are Clipped To Frame In Order To Fold Walking Trolley Substantially Flat"; Dale, G.; Nov. 16, 2011; (Year: 2011).*

*Primary Examiner* — Nathan J Newhouse
*Assistant Examiner* — Lester L Vanterpool
(74) *Attorney, Agent, or Firm* — Lowry Blixseth APC; Scott M. Lowry

(57) ABSTRACT

The breakaway walker tray includes a body defining a relatively planar surface and a pair of tubular grips formed from a portion of the body and selectively engageable with a pair of supports at least partially defining a frame of a walker. Each of the pair of tubular grips may be respectively engageable with the pair of supports in substantial friction-fit engagement therewith substantially along an entire surface area thereof. Moreover, the pair of tubular grips may break away from the pair of supports when under a load of a user falling on the body. Additionally, the body may also be made from a material having a rigidity maintaining the structure of the relatively planar surface when the body is coupled to the walker, while also being crushable under the weight of a user of the walker.

27 Claims, 13 Drawing Sheets

(56) References Cited

U.S. PATENT DOCUMENTS

D308,461 S * 6/1990 Hosea .................... A47G 19/06
D7/553.6
D308,497 S * 6/1990 Roche ......................... D6/406.3
D309,684 S * 8/1990 Kohler ........................ D7/552.2
4,946,058 A * 8/1990 Stamm ..................... A61H 3/00
224/558
4,985,932 A * 1/1991 Bezdek ................ A41B 13/103
229/407
5,012,963 A * 5/1991 Rosenbaum ............. A61H 3/00
224/407
5,133,377 A * 7/1992 Truxillo ................... A61H 3/04
135/75
5,170,810 A * 12/1992 Chapin .................... A61H 3/00
224/281
5,217,032 A * 6/1993 Jobst ........................ A61H 3/00
297/5
5,273,063 A * 12/1993 Farr ......................... A61H 3/00
482/66
D353,123 S * 12/1994 Korona .......................... D7/549
D366,780 S * 2/1996 Brooks .......................... D6/601
D367,834 S * 3/1996 Beavers ...................... D6/406.3
5,520,119 A * 5/1996 Eisenberg ............ A47B 23/002
108/43
5,531,238 A * 7/1996 Azzarelli ................. A61H 3/00
248/231.21
D387,623 S * 12/1997 Brooks ....................... D7/553.8
5,694,959 A * 12/1997 Hiller ....................... A61H 3/04
135/66
5,732,849 A * 3/1998 Brooks ................ A47B 23/002
220/17.1
5,882,067 A * 3/1999 Carbajal .................. A61H 3/00
135/74
5,957,530 A * 9/1999 Gutgsell ................ A47C 1/124
297/232
D423,290 S * 4/2000 Green ......................... D7/553.5
6,305,532 B1 * 10/2001 Overkamp ............. B60N 3/103
206/217
D510,481 S * 10/2005 Hodgson ........................ D3/304
7,040,637 B2 * 5/2006 Owens ..................... A61H 3/04
135/85
D564,421 S * 3/2008 McKenna .................... D12/133
8,534,520 B1 * 9/2013 Liparoti ................ B62B 3/1428
224/282
8,814,182 B1 * 8/2014 Kirby ....................... A61H 3/04
280/47.35
D745,442 S * 12/2015 McCuen ...................... D12/133
9,211,000 B1 * 12/2015 Storkel .................... A61H 3/00
9,565,929 B2 * 2/2017 Flannery .............. A47B 23/002
9,669,856 B2 * 6/2017 Hunt ........................ B62B 3/144
D793,915 S * 8/2017 Wang ........................... D12/130
D1,048,640 S * 10/2024 Pedersen ......................... D34/27
2005/0067004 A1 * 3/2005 Kvaternik ................ A61H 3/00
135/67
2006/0076382 A1 * 4/2006 Housman .................. A45F 5/00
224/681
2008/0141911 A1 * 6/2008 McKenna .............. A47B 37/00
135/66
2010/0212707 A1 * 8/2010 McCarthy ................ A61H 3/04
135/66
2010/0275818 A1 * 11/2010 Ellis ....................... A47B 23/04
108/147.11
2012/0060877 A1 * 3/2012 Kirby ....................... A61H 3/04
135/66
2012/0318312 A1 * 12/2012 McCarthy ................ A61H 3/04
135/66
2014/0261589 A1 * 9/2014 Reda ........................ A61H 3/00
135/66
2016/0199247 A1 * 7/2016 McCuen .................. A61H 3/04
108/26
2017/0086603 A1 * 3/2017 Sortino ...................... F16B 1/00
2017/0239128 A1 * 8/2017 Flora ........................ A61H 3/04
2018/0369059 A1 * 12/2018 Shirley ..................... A61H 3/04
2021/0386612 A1 * 12/2021 Colon ...................... A61H 3/00

* cited by examiner

BREAKAWAY WALKER TRAY

BACKGROUND OF THE INVENTION

The present invention generally relates to a breakaway walker tray. More specifically, the present invention relates to a walker tray made from a material relatively easily able to breakaway under the weight of a human, and having one or more grips designed for engagement and/or removal with one or more support members of a walker or walking frame.

A walker or walking frame is a medical device that was first designed in about the early 1950's to provide support for people in need of assistance while walking, such as to aid in maintaining balance and/or stability. Most commonly, walkers and walking frames are prescribed for the elderly who have age-related physical restrictions that make walking difficult without added support. Although, over the years, various walkers and walking frames have been designed for a wider variety of people, including being prescribed for pediatric (children) and/or bariatric (obese) purposes, for use by younger people who may have an ailment or be in rehab (e.g., as a result of an accident or sports related injury), and being prescribed for post-surgery patients. When in use, traditional walkers were intended to be lifted and placed at a forward distance in front of the user, wherein the user could lean on the walker for support during forward stepping movement. Variations of this design include affixing felt (e.g., tennis balls) or skis to the bottom front two legs to reduce ground-related friction if the user were unable to lift the walker and instead needed to slide the walker across the ground. Of course, in other designs, the felt bottoms or skis may be replaced by a pair of front wheels or the walker may include four wheels with hand brakes. Additionally, walkers may also be height adjustable to beneficially allow the user to maintain a slight arm bend, which helps facilitate blood circulation through the arms during use.

In one example, FIG. 1 illustrates a standard walker 20 known in the art having a generally rectangular construction, including a pair of height adjustable upside down U-shaped support members 22 that each include horizontal upper and lower reinforcement members 24, 26. Each U-shaped support member 22 may also include a hand grip 28 at an apex 30 thereof to provide padded or gripped support when maneuvering the standard walker 20 by hand, as briefly mentioned above. A pair of upper and lower front support members 32, 34 generally position each of the U-shaped support members 22 at a width comfortable for user movement. That is, each of the U-shaped support members 22 should be spaced apart wide enough to permit the user to engage each of the hand grips 28 from within a three-sided enclosure generally formed by the U-shaped support members 22 and the upper and lower front support members 32, 34. Of course, the standard walker 20 may come in various shapes and/or sizes.

Although, as walker use has become more widespread over the years with respect to hospital use and everyday residential use, so has the demand for versatility. For example, accessories such as baskets, cell phone holders, pouches or other pocketed organizers may be attached to the walker and be designed to hold contents during walker movement. This obviously allows the user to carry certain items while continuing to operate the walker with two hands. Other features may also include trays that selectively couple to or are otherwise designed to permanently attach to the walker or walking frame. Such trays may be designed to retain certain items such as food plate or beverage containers on a generally horizontal surface so the walker can be used in conjunction with an eating surface. Trays of this nature known in the art are typically made from a hard-plastic material that, while potentially washable and reusable, can be particularly unsafe as plastic typically does not yield, e.g., if a user were to accidentally fall on the tray. Moreover, trays designed to attach to the walker are difficult to install (especially for users with reduced dexterity) and undesirably increase the otherwise lightweight nature of the walker.

In this respect, one example of a prior art food tray is illustrated in FIG. 2 with respect to a slide-on walker tray 36 that attaches to the standard walker 20 by way of a pair of elongated channels 38 that have a size and shape for select slide-in reception on the upper ends of the U-shaped support members 22. The slide-on walker tray 36 is generally supported by each of the outstretched U-shaped support members 22 in the generally horizontal position illustrated in FIG. 2. While perhaps easy to install, the slide-on walker tray 36 does not actually attach to any aspect of the frame thereof and, therefore, remains unstable and can easily disengage the standard walker 20 and fall off. This may be especially so in the event the standard walker 20 is tipped forward or to the side. Moreover, the slide-on walker tray 36 illustrated in FIG. 2 is manufactured from a hard-plastic material that could injure the user, e.g., if the user were to fall on the slide-on walker tray 36.

In another example, FIG. 3 illustrates a foldable walker tray 40 that mechanically attaches to the front of the standard walker 20 by way of a series of braces, bolts, and linkages. Here, the foldable walker tray 40 includes a pair of braces 42 that attach to each of the U-shaped support members 22 by a pair of upper and lower brackets 44, 46. A tray 48 couples to each of the braces 42 about a respective pivot 50 and a respective linkage 52 pivotally coupled to the brace 42. In operation, the tray 48 can pivot between an extended use position illustrated in FIG. 3 and a folded non-use position by moving the tray 48 about the pivots 50 such that the linkage 52 slides within a slide channel 54 toward or away from the front of the tray 48. Of course, the drawback of this foldable walker tray 40 is that it is difficult to install (i.e., requiring a minimum amount of dexterity to assemble each of the braces 42, the upper and lower brackets 44, 46, the tray 48, the pivots 50, and the linkages 52 to the front of the standard walker 20) and can be difficult for some to operate (i.e., requiring enough stability, coordination, and strength to move the tray 48 between use and non-use positions). Similarly, once assembled, the foldable walker tray 40 is difficult to remove, if desired. Similar to the slide-on walker tray 36, the plastic design of the tray 48 can also be a safety hazard, as mentioned above, if a user were to fall on the tray 48 regardless whether the tray 48 is in the use position (FIG. 3) or non-use position (not shown). The braces 42, the upper and lower brackets 44, 46, the tray 48, the pivots 50, and the linkages 52 also undesirably increase the weight of the standard walker 20 and can impart a front heavy load thereto, thereby increasing the difficulty of operating the standard walker 20 and increasing the potential for the standard walker 20 to fall forward.

There exists, therefore, a significant need in the art for a breakaway walker tray made from a crushable lightweight material that breaks or buckles under the weight of a human, and includes a series of tubular grips that permit one-step attachment to and/or detachment from one or more support members of a walker or walking frame. The present invention fulfills these needs and provides further related advantages.

SUMMARY OF THE INVENTION

The breakaway walker tray as disclosed herein may be made from a material relatively easily breakable under the weight of a human (e.g., an expanded polystyrene ("EPS") material) and may include one or more grips designed for select one step engagement and/or removal with one or more support members of a walker or walking frame.

More specifically, in one embodiment, the breakaway walker tray may include a body defining a relatively planar surface for placement of items such as dishes, cups, silverware, books, games, or other miscellaneous items of comparable size and shape of which may be desired to place on or be carried by the relatively planar surface of the body. Furthermore, a pair of tubular grips may be formed from a portion of the body and may be selectively engageable with a pair of supports at least partially defining a frame of a walker. Here, each of the pair of tubular grips may be respectively engageable with the pair of supports in substantial friction-fit engagement therewith substantially along an entire surface area thereof to enhance engagement therewith. The pair of tubular grips may couple to the frame in a manner that allows the body to break away from the pair of supports when under a load of a user falling on the body, to enhance safety, especially relative to designs known in the art to use a hard-plastic material.

The breakaway walker tray as disclosed herein may also include a pair of angled flanges extending from opposite sides of the relatively planar surface. Here, each of the angled flanges may include one of the pair of tubular grips formed therein. As such, each of the pair of tubular grips may include a generally longitudinal arcuate opening formed from a bottom surface in each of the angled flanges. The pair of tubular grips may include an opening relatively smaller than an external diameter of the pair of supports when in a normal relaxed position, wherein the opening may be enlargeable to at least be commensurate in size with the external diameter of the pair of supports when in a second insertion position permitting slide-in engagement of the pair of supports within the pair of tubular grips. As such, the opening may substantially return to the normal relaxed position after slide-in engagement thereof such that the tubular grips cup the pair of supports therein. Here, the pair of tubular grips may include an arcuate opening or a straight opening. The arcuate opening may provide more cupped support when the supports are within the tubular grips, while the straight opening may permit easier engagement and/or disengagement of the breakaway walker tray with the frame of the walker since the straight opening may not need to be enlarged, if at all, to slide the support into the tubular grip.

In another aspect of the embodiments disclosed herein, the breakaway walker tray may include a pair of rear vertical block grips extending through a thickness of the body and intersecting the pair of tubular grips, which may be formed as a pair of slotted channels in a bottom surface of the body. Here, the pair of rear vertical block grips and the pair of slotted channels may each respectively engage a pair of upright walker arms and a pair of front support brackets of the walker.

Additionally, the pair of tubular grips may include a pair of vertical grips formed from an external sidewall of the body and form a partial arcuate cut-out through a thickness thereof. Moreover, each of the pair of vertical grips may taper inwardly from a bottom surface to an upper edge of the body and track the size and shape of the frame of the walker. The breakaway walker tray may also include a generally horizontal front tubular grip forming a front longitudinal channel from a bottom surface of the body and have a size and shape to accommodate select friction-fit engagement with an arcuate front support member of the walker. Here, the horizontal front tubular grip may also include a central protective sleeve cutout flanked on each side by a pair of relatively smaller arcuate front support channels.

In an alternative embodiment, the breakaway walker tray may further include a pair of notches formed from the body that have a size and shape for select friction-fit engagement with a pair of front angled support members of the walker. Moreover, the breakaway walker tray may also include a pair of slotted grip channels having a size and shape for select friction fit engagement with a pair of relatively rigid extensions coupled to a front strap protruding out from a slide bracket resting on a respective stop respectively coupled to the pair of supports. Here, each of the slotted grip channels may extend into the body and form a partial cut-out from a bottom surface thereof.

The breakaway walker tray may also include an insert having a generally arcuate configuration substantially tracking a surface area of one of the pair of tubular grips. Here, the insert may be made from a material relatively harder than the body to increase the longevity of the breakaway walker tray. The insert may further include an outwardly extending anchor terminating in a radially outwardly extending disk having an increased surface area permitting select engagement with the body along the respective tubular grip. Of course, the pair of grips may permit one step engagement and disengagement of the breakaway walker tray with the frame of the walker.

In another embodiment, the breakaway walker tray may include a body having a generally planar shape for select reception within a three-sided enclosure defined by a set of support members forming a walker. A pair of grips may be formed from the body and have a size and shape for select engagement with a pair of the set of support members of the walker. The body may be made from a material having a rigidity maintaining the generally planar shape of the body when the body spans between the pair of the set of support members when coupled to the walker by the pair of grips, yet being relatively crushable under the weight of a user of the walker. Here, the material forming the tray may be selected from the group consisting of an expanded polystyrene ("EPS") material, a Styrofoam material, a molded fiber material, a molded pulp material, an egg-carton material, a cardboard material, a material blended from fiberglass and cardboard, a relatively soft fiberglass, a molded fabric material, and a papier-mâché material.

In an additional embodiment, the body may further include an upstanding outer edge generally encompassing a recessed top surface positioned to an interior of the upstanding outer edge, wherein the recessed top surface includes a selectively removable surface covering that includes a relatively non-slip material. Such removable surface covering may be washable and reusable, or designed for single use applications (e.g., in a hospital setting). Additionally, the breakaway walker tray may also include a cupholder formed at least in part from a portion of the upstanding outer edge and at least in part from a cupholder edge projecting inwardly therefrom and into an area of the recessed top surface. An adapter having an external diameter approximately the same size as an internal diameter of the cupholder may be configured for slide-fit engagement therewith and designed to effectively change the internal diameter thereof, for purposes of adapting the cupholder for use with differently sized containers or cups.

Alternatively, the cupholder may be positioned to an interior of the upstanding outer edge and may include a cutout for accommodating an outwardly extending handle of a container retainable therein. In one embodiment, the cutout may be flush with the recessed top surface or the cutout may terminate somewhat above the surface of the recessed top surface to form a lip therein. Moreover, an insert having a generally arcuate configuration may substantially track a surface area of one of the pair of grips and may be made from a material relatively harder than the body. Such an insert may increase the longevity of the breakaway walker tray by enhancing the strength and overall rigidity of the grips, while also maintaining the lightweight and breakaway features of the tray that enhance safety. Similarly, the insert may include an outwardly extending anchor that terminates in a radially outwardly extending disk having an increased surface area permitting select engagement with the body along the respective tubular grip. Of course, in this embodiment, the pair of grips may permit one step engagement and disengagement of the breakaway walker tray with the frame of the walker for ease of use.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
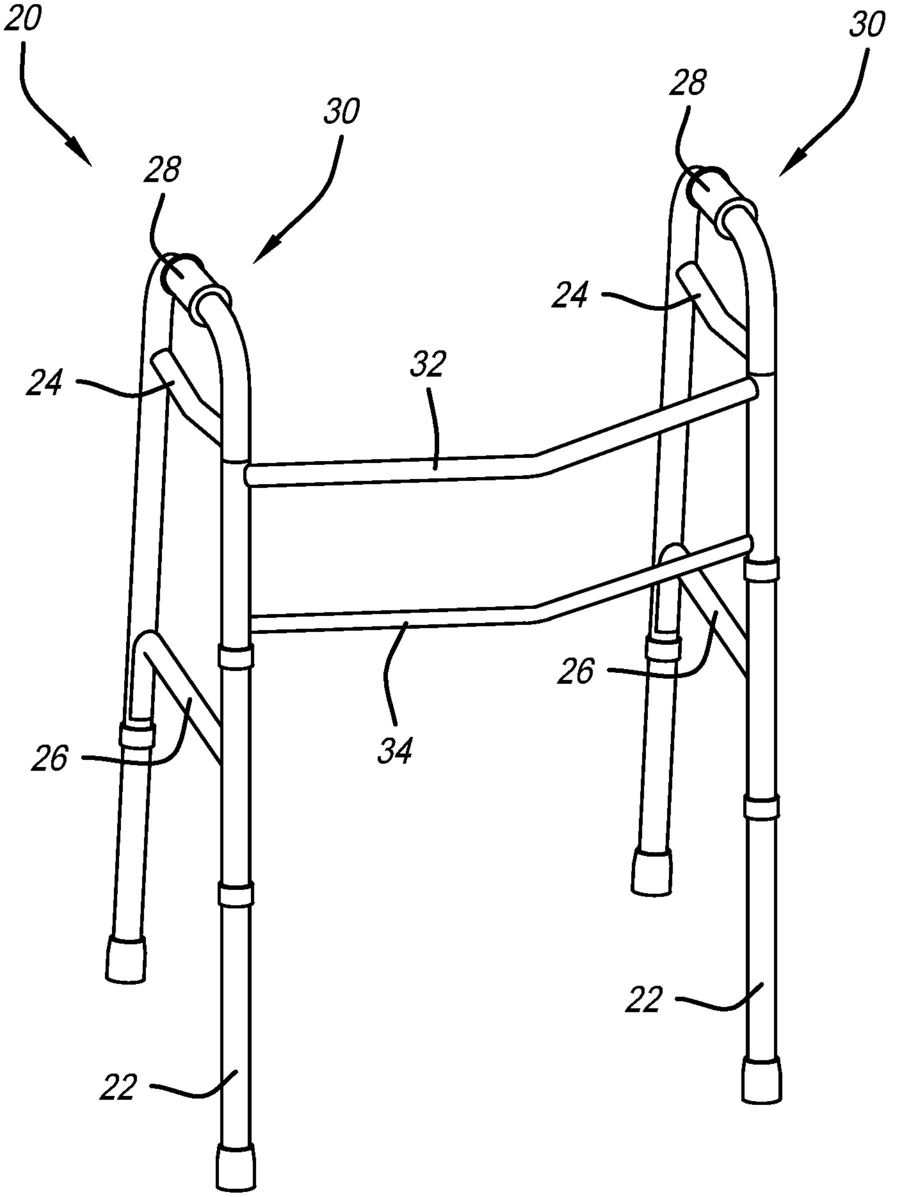
FIG. 1 PRIOR ART
FIG. 1 is a perspective view of a prior art standard walker.
Figure 2:
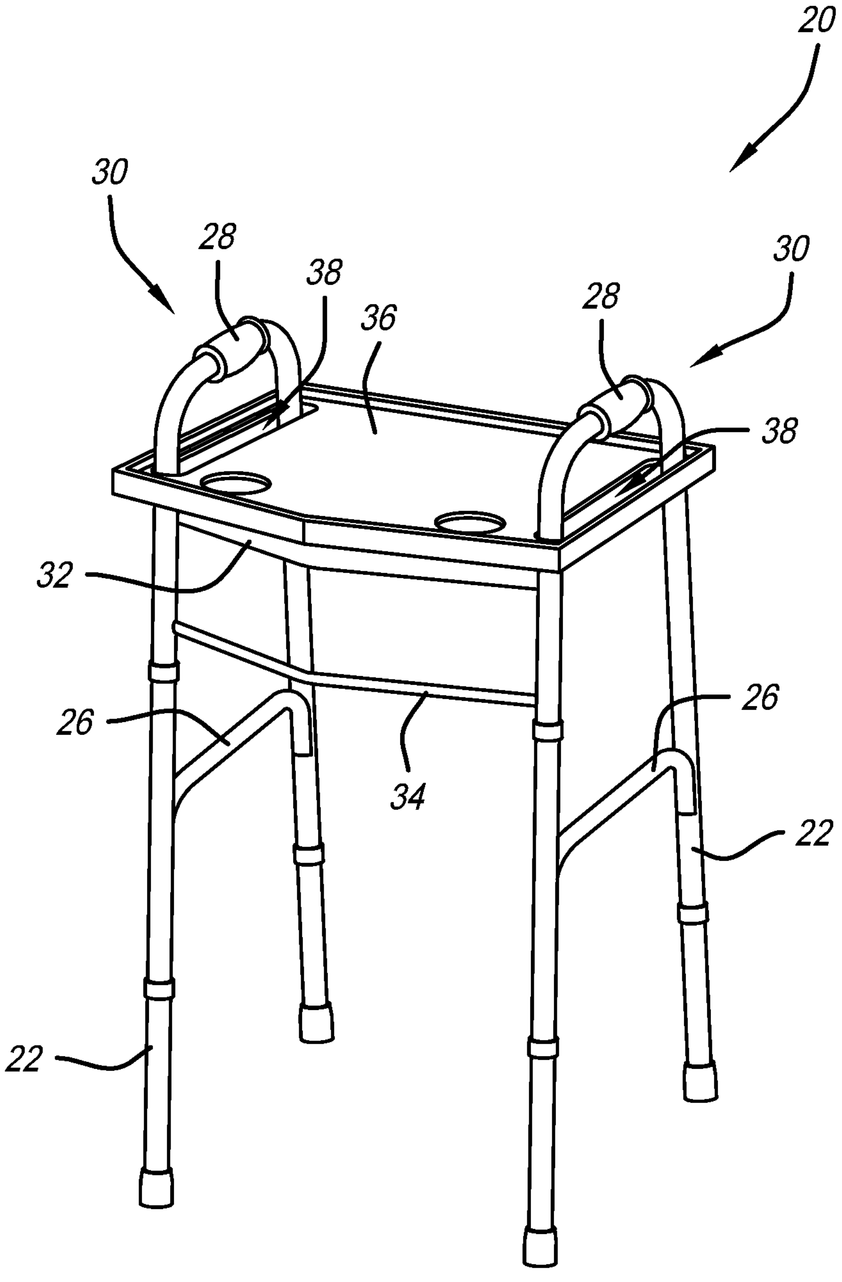
FIG. 2 PRIOR ART
FIG. 2 is a perspective view of a prior art slide-on walker tray coupled with the standard walker of FIG. 1.
Figure 3:
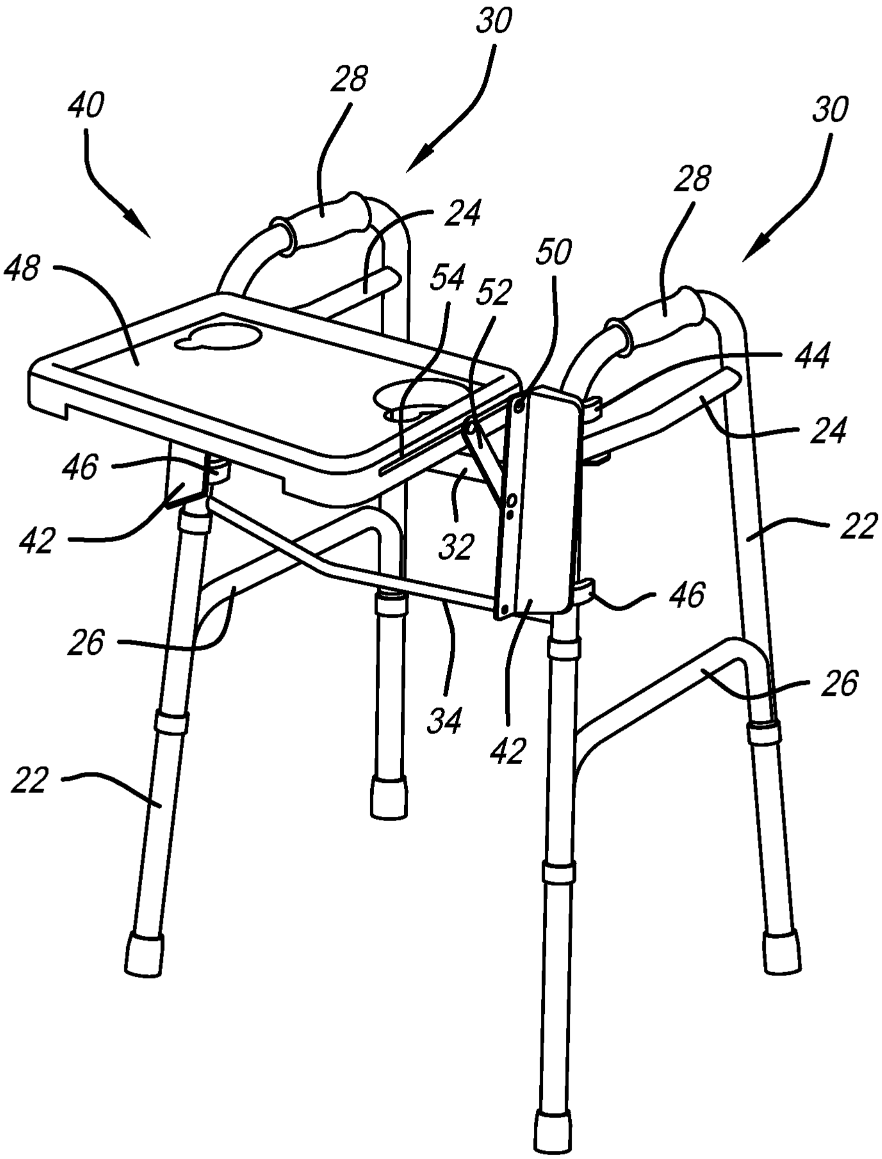
FIG. 3 PRIOR ART
FIG. 3 is a perspective view of a prior art foldable walker tray mechanically coupled to the standard walker of FIG. 1 and in an upwardly extended use position.

As shown in the exemplary drawings for purposes of illustration, the present invention for a breakaway walker tray is generally illustrated in FIGS. 4-7, 9 and 11-18 with respect to reference numerals 56, 56', 56". In general, each of the breakaway walker trays 56, 56', 56" may be made from a material having a rigidity to hold items placed thereon (e.g., cups dishes, games, books, etc.), yet designed to fail under load, such as under a minimum amount of pressure resultant from a user falling thereon, especially given that users are prone to fall when using the walker 20 or the like. Such a design characteristic may be advantageous over prior art plastic-based walker trays as a relatively safer alternative in view that walkers (e.g., the standard walker 20) are typically used by the elderly and/or individuals who otherwise do not have the needed strength and/or mobility to walk without such an aide. Accordingly, in one embodiment, the breakaway walker trays 56, 56', 56" may be made from a recyclable or non-recyclable expanded polystyrene ("EPS") material, Styrofoam material, molded fiber or molded pulp material (e.g., comparable to a material used to make an egg-carton), a cardboard material, a blend of fiberglass and cardboard, a papier-mâché material, a molded fabric material, a relatively soft fiberglass, or another comparable material or blended material designed to bend or breakaway when placed under load. In this respect, in the event a user accidentally falls onto any one of the breakaway walker trays 56, 56', 56" disclosed herein, the material construction thereof will at least yield, and possibly fail, e.g., compress or crush under the weight of the user, so as to prevent injury. In fact, such materials may even provide cushioning in the event of a fall since some of the above-mentioned materials are frequently used to provide, e.g., cushioned protection in product packaging for shipping purposes. Moreover, said materials are also lightweight when compared to hard plastic or metal, so the walker or walking frame remains relatively lighter and more easily movable when compared to prior art designs that incorporate use of plastic trays, and especially those designs that require use of additional metal braces and linkages to attach the plastic tray to the frame. Moreover, and as discussed in more detail herein, the breakaway walker trays 56, 56', 56" may also include one or more tubular grips designed to quickly attach and/or detach the breakaway walker trays 56, 56', 56" to the walker or walking frame as needed or desired, and may be a single use product (e.g., recycled after one use, such as in a hospital) or designed for repeat use (e.g., being washable).

Figure 4:
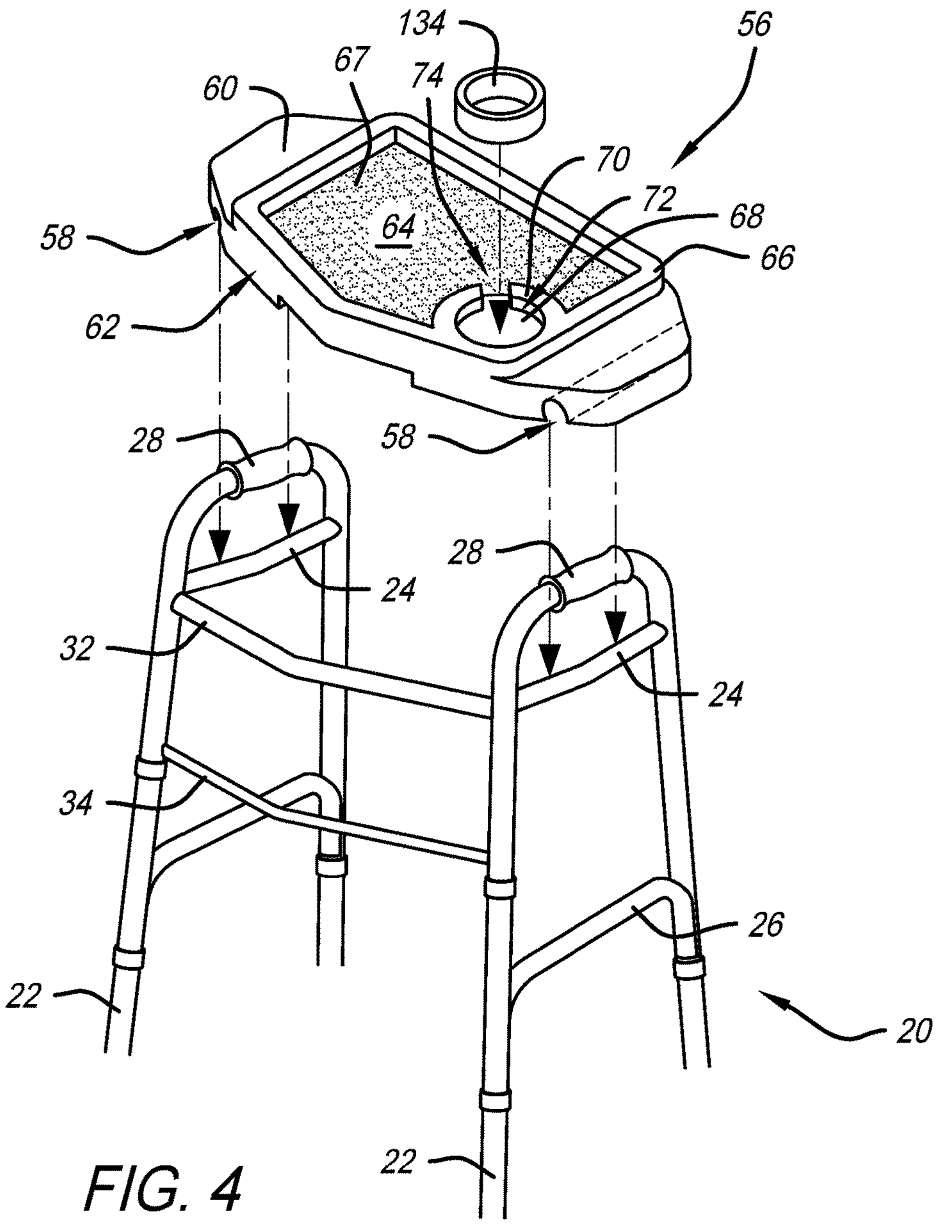
FIG. 4 is a perspective view of one embodiment of a breakaway walker tray as disclosed herein, including a pair of relatively horizontal tubular grips engageable with a pair of upper reinforcement members of the standard walker.

More specifically, FIG. 4 illustrates one embodiment of the breakaway walker tray 56 for use with the standard walker 20 as disclosed above with respect to FIG. 1. As shown, the breakaway walker tray 56 may be of a generally rectangular configuration sized to fit within a three-sided enclosure formed by the U-shaped support members 22 and the upper and lower front support members 32, 34. In this respect, a body 60 of the breakaway walker tray 56 may be of a size so that a pair of relatively horizontal tubular grips 58 formed therein land on each of the opposing upper reinforcement members 24. As such, when in an installed position, the standard walker 20 may at least effectively provide two-sided support for the breakaway walker tray 56 by way of the two upper and generally horizontally located reinforcement members 24 parallel to one another. Alternatively, the body 60 may have a size and shape such that a front 62 thereof additionally lands on the upper front support member 32, such that the standard walker 20 effectively provides three-sided support for the breakaway walker tray 56.

Each of the horizontal tubular grips 58 may be of a size and shape designed for engagement with the respective pair of upper reinforcement members 24. Specifically, in one embodiment, the horizontal tubular grips 58 may have an internal diameter relatively smaller than an external diameter of the upper reinforcement members 24, yet large enough to provide a snug friction fit engagement therewith. Here, enhanced surface tension of Styrofoam or a like material having relatively high coefficient of friction may be able to form a tighter grip between the horizontal tubular grips 58 and the corresponding upper reinforcement members 24 when the breakaway walker tray 56 is attached to the standard walker 20. During installation, e.g., each of the horizontal tubular grips 58 may flex open to provide sufficient room for inserting the upper horizontal reinforcement members 24. Then, once inserted and installed, the resilient material of the horizontal tubular grips 58 may return to a substantially normal non-flexed position substantially surrounding the upper horizontal reinforcement members 24. In this normal relaxed position, the horizontal tubular grips 58 may have an opening therein relatively smaller than the horizontal reinforcement members 24, thereby substantially preventing removal therefrom without again flexing open the horizontal tubular grips 58. Alternatively, the horizontal tubular grips 58 may have an internal diameter approximately the same as or relatively larger than the external diameter of the upper reinforcement members 24, whereby the horizontal tubular grips 58 simply slide on to the horizontal reinforcement members 24 for engagement therewith. Of course, any of the aforementioned features may be incorporated into any of the components disclosed herein designed for friction fit or slide-on engagement.

Figure 5:
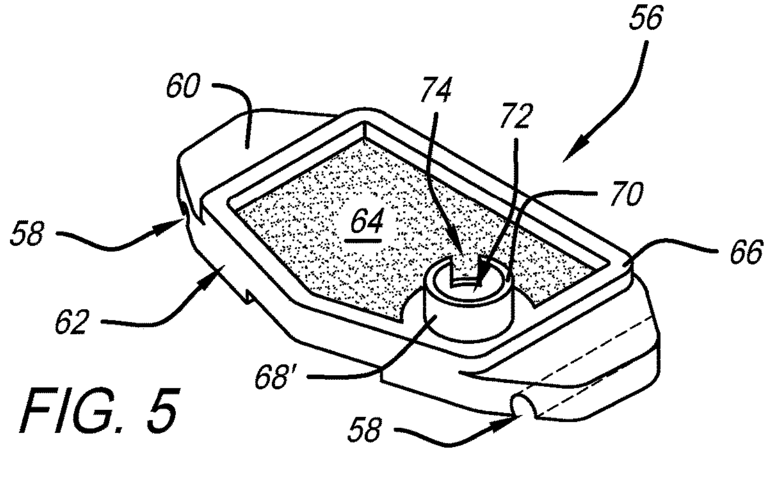
FIG. 5 is a perspective view of the breakaway walker tray of FIG. 4, incorporating an alternative cupholder having a relatively taller cupholder edge upwardly extending beyond that of the upper edge of the breakaway walker tray.
Figure 6:
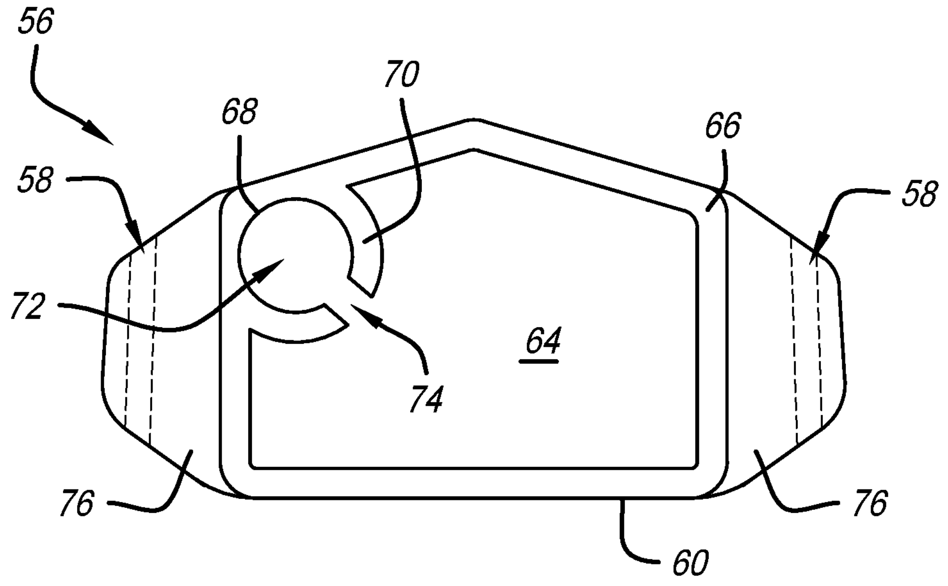
FIG. 6 is a top view of the breakaway walker tray of FIG. 4, more specifically illustrating the relative location of the pair or horizontal tubular grips formed from a bottom surface of the breakaway walker tray.

As shown in FIGS. 4-6, the breakaway walker tray 56 may include a recessed top surface 64 surrounded or otherwise enclosed by an upwardly projecting edge 66. This may form an enclave therein to keep spilled food or beverage retained within the confines of the recessed top surface 64, even in the event that the breakaway walker tray 56 is not installed substantially horizontally. In one embodiment, the recessed top surface 64 may include an additional surface covering 67 that may couple thereto, such as by way of an adhesive. In this respect, the adhesive may permanently or removably attach the surface covering 67 to the recessed top surface 64. Removable attachment may be used in settings where the breakaway walker tray 56 is reused. Here, the surface covering 67 may be detached and washed for reuse, or the surface covering 67 may simply be thrown away and replaced by a new one. The surface covering 67 may also be made from a generally non-skid or non-slip material such as plastic or vinyl designed to prevent movement of items set thereon, such as cups, plates, and silverware. Alternatively, in addition to or in place of, the recessed top surface 64 and/or the surface covering 67 may be configured for use with a placemat.

Moreover, FIGS. 4-6 also illustrate that the breakaway walker tray 56 may define a cup holder 68 that varies in size and shape. For example, in one embodiment, FIGS. 4 and 6 illustrate that the cupholder 68 resides within the recessed top surface 64 formed in part from the upper edge 66 and in part by a cup holder edge 70 upwardly projecting from the recessed top surface 64 to an interior of the upper edge 66. Additionally, the upper edge 66 and the cup holder edge 70 may define an interior 72 receptive of a beverage container that may vary in size, shape, and configuration. As illustrated in FIGS. 4-6, the interior 72 is circular in shape, but a person of ordinary skill in the art will readily recognize that the cupholder 68 could be any shape known in the art. Additionally, a cutout 74 therein is illustrated in FIG. 4 flush with the recessed top surface 64, and designed to accommodate, e.g., a beverage glass handle that would otherwise project outwardly from the enclave of the interior 72.

In another example, FIG. 5 illustrates an alternative embodiment of a cupholder 68' wherein the cupholder edge 70 solely defines the interior 72 thereof, i.e., the cupholder 68' includes edges 70 that are not formed from a portion of the upper edge 66. Here, the cupholder edge 70 is freestanding and formed entirely to an interior of the upper edge 66. Moreover, the cutout 74 is illustrated in FIG. 5 formed from only a portion of the vertical sidewall forming the cupholder edge 70. As such, the cupholder edge 70 forms the circular interior 72 and is completely sectioned off from the rest of the recessed top surface 64. The size and/or shape of the cupholder 68, 68' and/or the cutout 74 may vary depending on the shape and type of container and/or its handle to be used therewith.

Of course, in general, the size and/or shape of the cupholders 68, 68' may vary from embodiment to embodiment. This may include variations in the size of the circular interior 72, height of the cupholder edge 70, and, e.g., the size and/or shape of the cutout 74. Ideally, the interior 72 is of a size and shape to accommodate slide-in reception of an appropriately sized cup for snug friction fit engagement therewith, e.g., similar to that of an insulating sleeve used to keep a canned or bottled drink cold. Thus, larger containers will obviously require a relatively larger interior 72, while smaller containers will ideally be used with relatively smaller interiors 72. Additionally, while the interior 72 is illustrated in FIGS. 4-6 as a generally "circular" shape, the interior 72 may also vary in size and shape (e.g., square, rectangular, etc.). In this respect, the cupholders 68, 68' may be designed to hold or retain items other than containers or cups. For example, a similarly formed rectangular holder may be designed to hold a plate of commensurate size and shape.

Of course, the cupholders 68, 68' may be made from the same type of material as the body 60 of the breakaway walker tray 56, or other materials as may be known in the art (e.g., foam or the like). Additionally, the recessed top surface 64 the surface covering 67 in the form of a tacky, but non-stick surface (e.g., as indicated by the shaded area in FIGS. 4 and 5), to help prevent movement of items (e.g., silverware, plates, etc.) placed on the breakaway walker tray 56. Additionally, similar to the recessed top surface 64 and/or the surface covering 67, either of the cupholders 68, 68' may be lined with a non-skid or non-slip plastic or vinyl material to help retain a container (e.g., a drinking cup or the like) therein.

Figure 7:
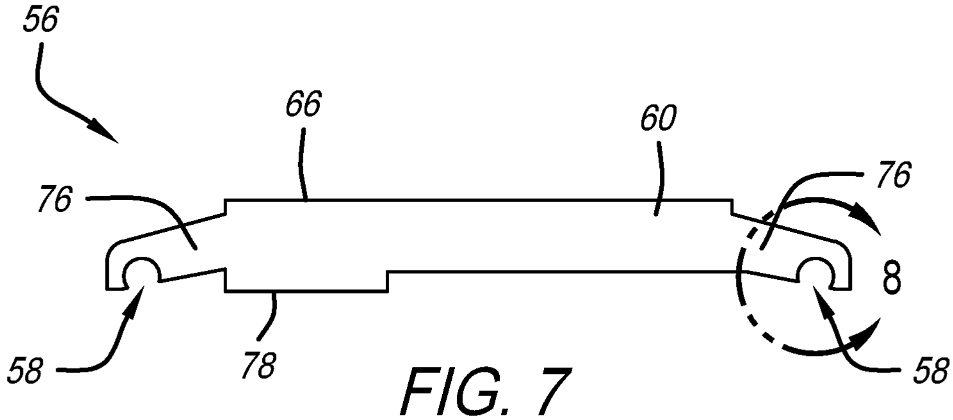
FIG. 7 is a front view of the breakaway walker tray of FIGS. 4 and 6, more specifically illustrating the pair of horizontal tubular grips extending width-wise therethrough.

FIG. 7 is a front view of the breakaway walker tray 56 further illustrating each of the horizontal tubular grips 58 formed from the body 60 thereof. As shown, each of the horizontal tubular grips 58 may have a generally semi-cylindrical shape and be formed as a cut out or channel in a respective pair of flanges 76 that extend downwardly at an angle from the recessed top surface 64. Although, of course, the horizontal tubular grips 58 may vary in size and shape (including, e.g., the horizontal tubular grips 58 may be angled, curved, V-shaped, etc.), depending on the desired application; and the flanges 76 may be substantially horizontal as opposed to downwardly extending as illustrated best in FIG. 7. The downwardly extending flanges 76, especially, may be designed to present the recessed top surface 64 at a higher position relative to, e.g., the upper reinforcement members 24. Moreover, at least a portion of the cupholder 68 may extend down below the recessed top surface 64 as illustrated in FIG. 7 as a downwardly extending protrusion 78. The downwardly extending protrusion 78 may facilitate seated reception of a beverage container or the like within the cupholder 68 and at a position relatively lower or below the recessed top surface 64. This may help retain the beverage container within the cupholder 68. Although, of course, the downwardly extending protrusion 78 is optional. In this latter embodiment, the bottom of the cupholder 68 may be substantially flush with the recessed top surface 64.

Figure 8A:
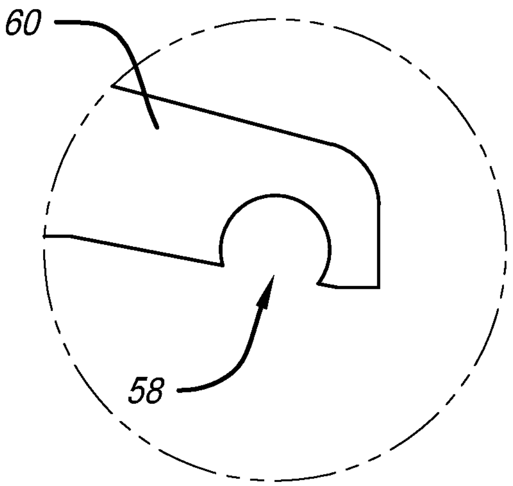
FIG. 8A is an enlarged front view taken about the circle 8 in FIG. 7, more specifically illustrating that the horizontal tubular grip includes an inwardly curved opening.
Figure 8B:
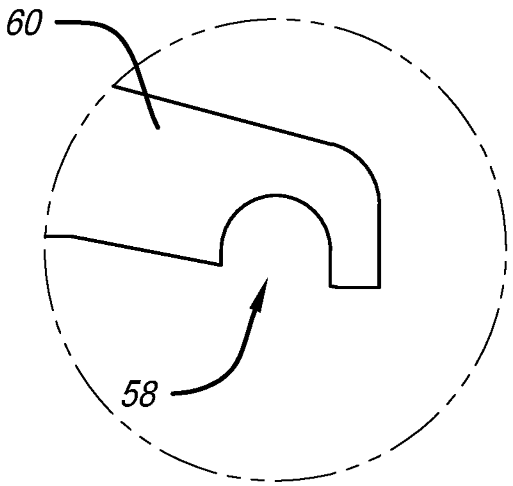
FIG. 8B is an enlarged front view similar to FIG. 8A, illustrating an alternative embodiment wherein the horizontal tubular grip includes a relatively straight opening.

FIG. 8A illustrates one embodiment of the horizontal tubular grips 58 terminating in a generally inwardly curved configuration, while FIG. 8B illustrates an alternative embodiment wherein the horizontal tubular grips 58 terminate in a relatively straight opening. In the former embodiment illustrated in FIG. 8A, the inwardly curved configuration may terminate in an opening generally smaller than an external diameter of the support member to which the grip is to attach. As such, the material forming the grip 58 must be able to stretch or bend to open enough to fit the support member therein for cupped engagement therewith. Such an embodiment may generally prevent the breakaway walker trays 56, 56', 56" from slide-off disengagement from the attached-to walker since the tubular grips 58 will generally cup more than half of the external diameter of the respective member to which it is attached. Although, even in embodiments wherein the tubular grips 58 are relatively smaller than the opening illustrated in FIG. 8A, the tubular grips 58 may still selectively receive and retain the respective support members therein, albeit not necessarily being in friction-fit engagement therewith. The latter embodiment illustrated in FIG. 8B does not have the same sort of cupped engagement with the support member, and may be easier to attach and/or remove from the respective breakaway walker tray 56, 56', 56" since the open diameter of the tubular grip 58 is commensurate in scope, or somewhat larger than, the respective support member. Such a configuration may better facilitate slide-on reception. Although, a support member having a similarly sized external diameter may still be able to engage the straight opening of the tubular grip 58 illustrated in FIG. 8B by friction-fit engagement.

Figure 9:
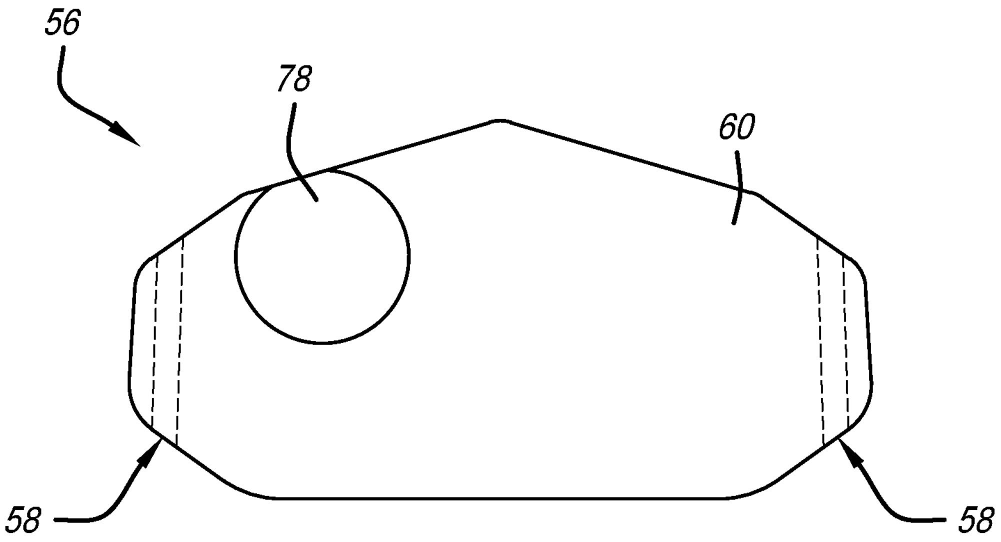
FIG. 9 is a bottom view of the breakaway walker tray of FIGS. 4, 6, and 7, further illustrating the pair of horizontal tubular grips formed within the bottom surface thereof.

Additionally, FIG. 9 is a bottom plan view of the breakaway walker tray 56 illustrated with respect to FIGS. 4-7, more specifically illustrating each of the horizontal tubular grips 58 formed lengthwise within the body 60 thereof and the downwardly extending cup holder protrusion 78.

Figure 10:
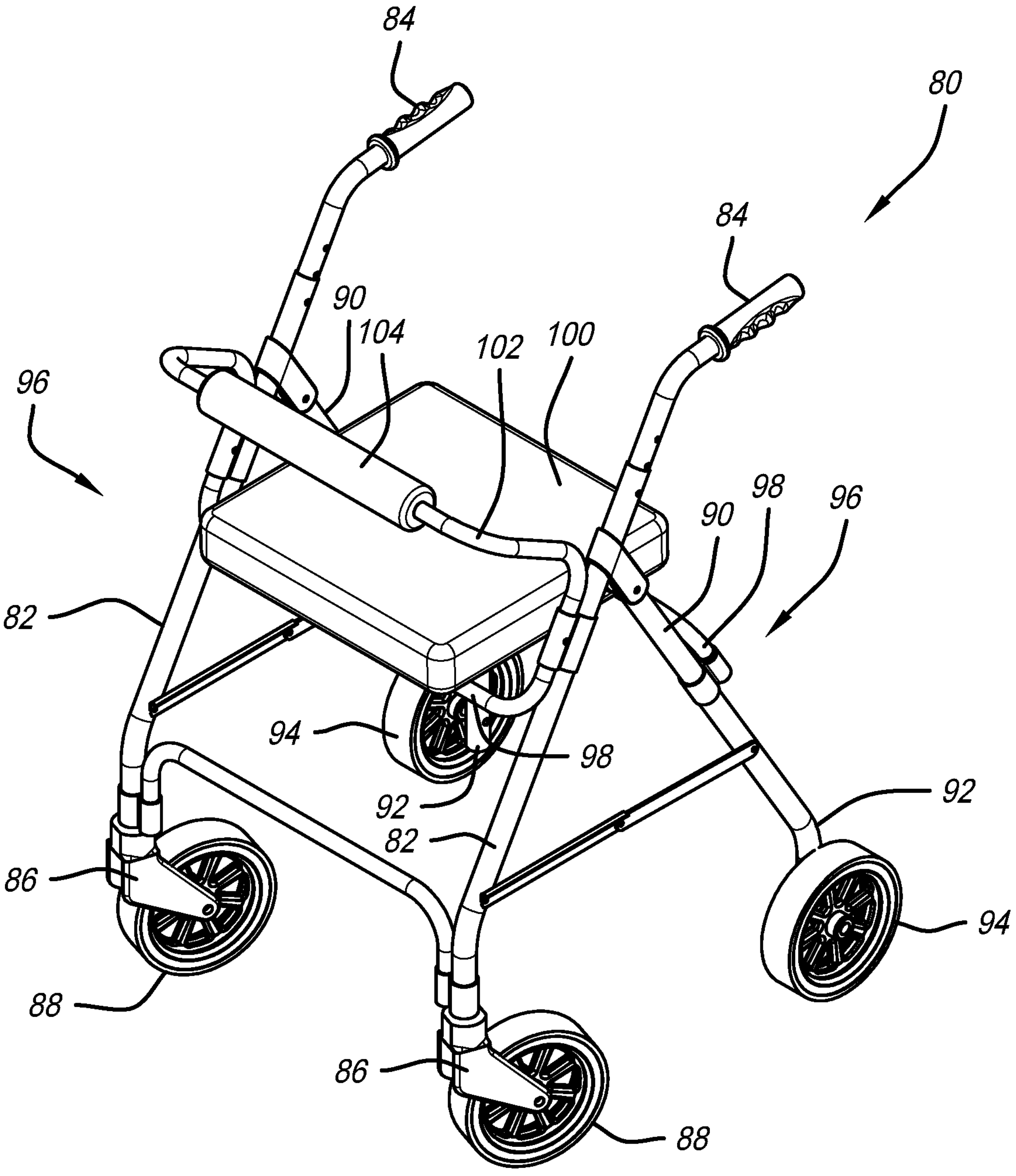
FIG. 10 PRIOR ART
FIG. 10 is a perspective view of a prior art rolling walker having an X-shaped frame.
Figure 11:
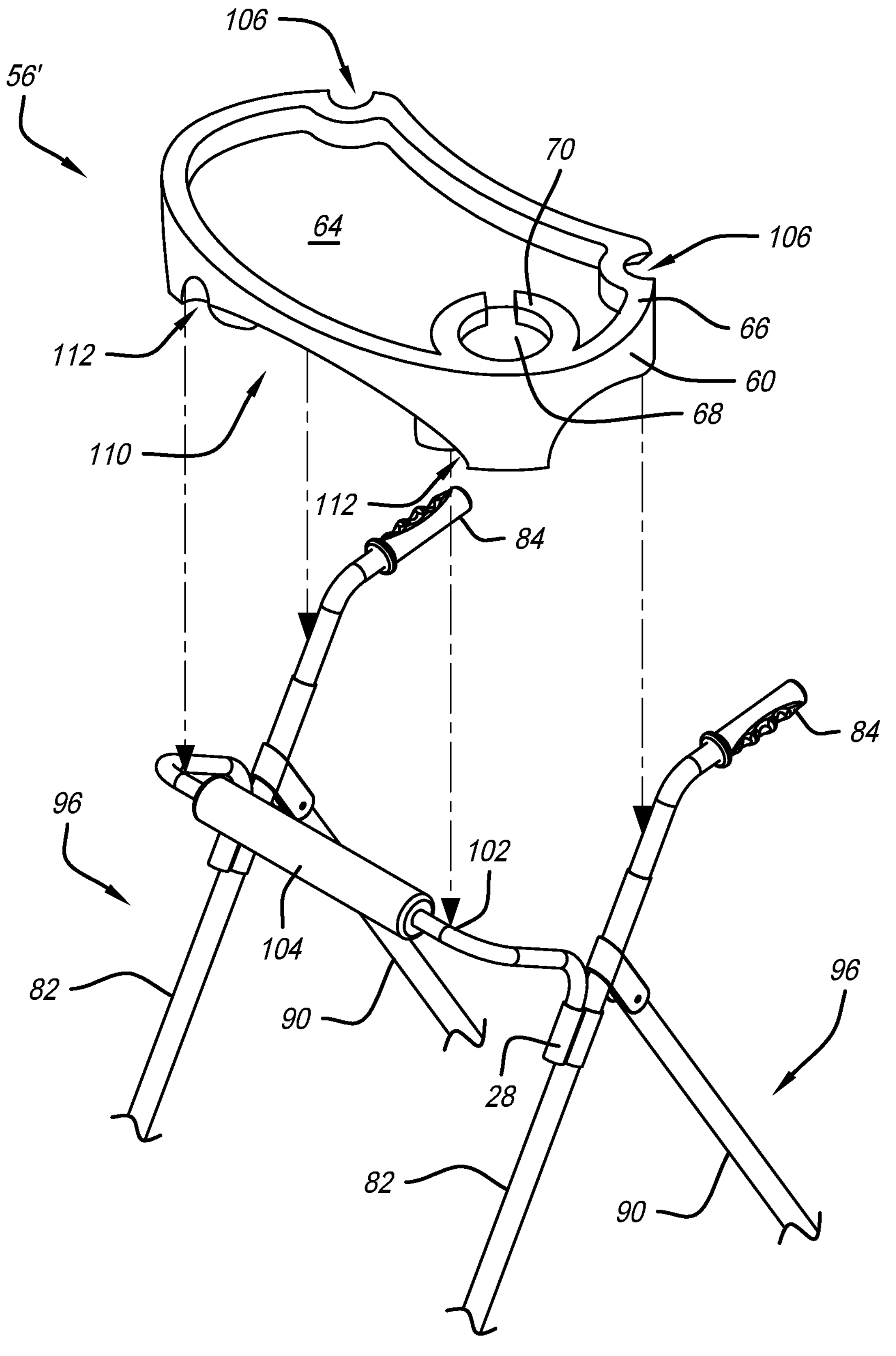
FIG. 11 is a perspective view of an alternative breakaway walker tray as disclosed herein having a pair of angled tubular grips and a pair of horizontal front tubular grips engageable with the X-shaped body and an arcuate front support member of the rolling walker of FIG. 10.

FIG. 10 illustrates a prior art rolling walker 80 for use with an alternative breakaway walker tray 56' as disclosed herein with respect to FIG. 11. Specifically, the rolling walker 80 has a pair of front angled support members 82 originating at one end having a handle 84 and terminating in a respective pair of front support casters 86 carrying a respective set of front wheels 88. Moreover, the rolling walker 80 also includes a pair of rear angled support members 90 that originate in an angled connection to respective front angled support members 82 between the handles 84 and the front support casters 86, and terminate in a respective rear support caster 92 carrying a respective rear wheel 94. As such, intersection of the front angled support members 82 with the rear angled support members 90 generally forms a pair of opposing X-shaped frames 96. Moreover, the rolling walker 80 illustrated in FIG. 10 may also include a pair of upper seat supports 98 having a length to generally position each of the X-shaped frames 96 at a width comfortable for user movement. The pair of upper seat supports 98 may also provide horizontal support for a seat 100 thereon as illustrated in FIG. 10. The rolling walker 80 may also include a forwardly projecting arcuate front support member 102 having a generally cylindrical protective sleeve 104 designed to limit backward movement off the seat 100, i.e., the arcuate front support member 102 and its protective sleeve 104 may serve as a cushioned restraint.

Figure 12:
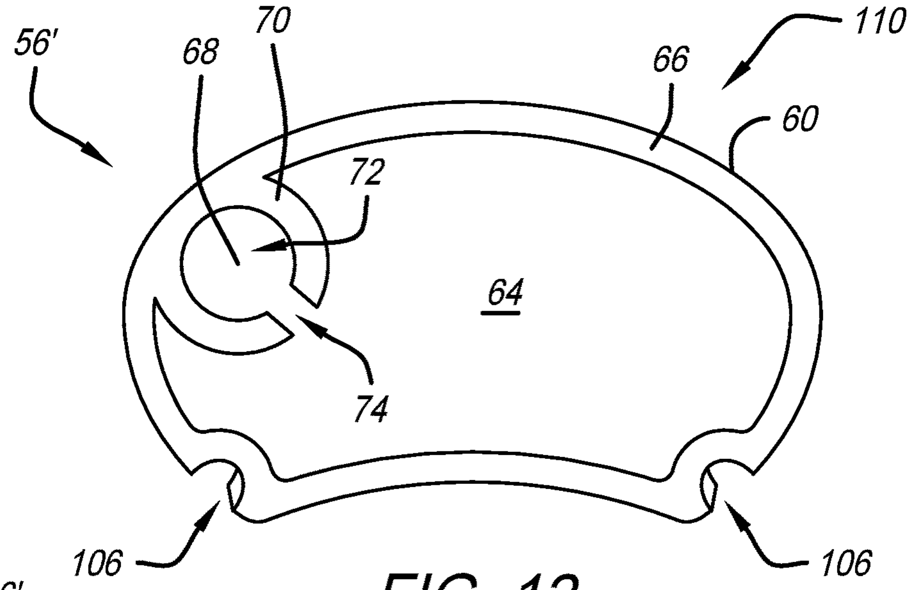
FIG. 12 is a top plan view of the alternative breakaway walker tray of FIG. 11, more specifically illustrating the pair of angled tubular grips extending through a width of the breakaway walker tray.
Figure 13:
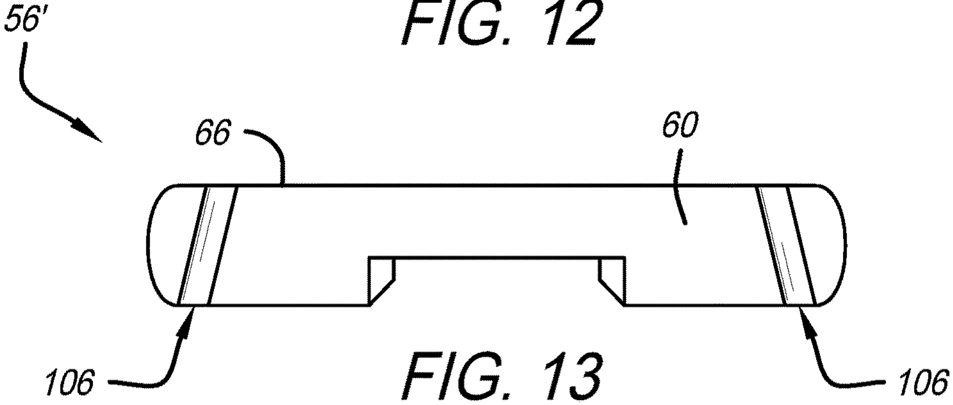
FIG. 13 is a front view of the alternative breakaway walker tray of FIGS. 11 and 12, more specifically illustrating the pair of angled tubular grips extending through the width of the breakaway tray body.

FIG. 11 illustrates the alternative breakaway walker tray 56' for use with the prior art rolling walker 80, e.g., as disclosed above with respect to FIG. 10. Here, the alternative breakaway walker tray 56' may include a pair of vertical tubular grips 106 formed from the body 60 of the breakaway walker tray 56', which may similarly be manufactured from a breakaway material, such as any of the materials mentioned above. More specifically, the vertical tubular grips 106 may have a size and shape for select engagement (e.g., including friction fit engagement) to a portion of each of the front angled support members 82. As such, FIGS. 11 and 12 illustrate that each of the vertical tubular grips 106 extend through the body 60 and form a partial cut-out from the upper edge 66. Additionally, FIG. 13 is a front elevational view of the breakaway walker tray 56', and further illustrates that each of the vertical tubular grips 106 may taper inwardly from a bottom surface 108 (FIG. 14) to the upper edge 66 to track the geometry of each of the front angled support members 82 toward the handle 84 above where the rear angled support member 90 couples to the front angled support member 82.

Figure 14:
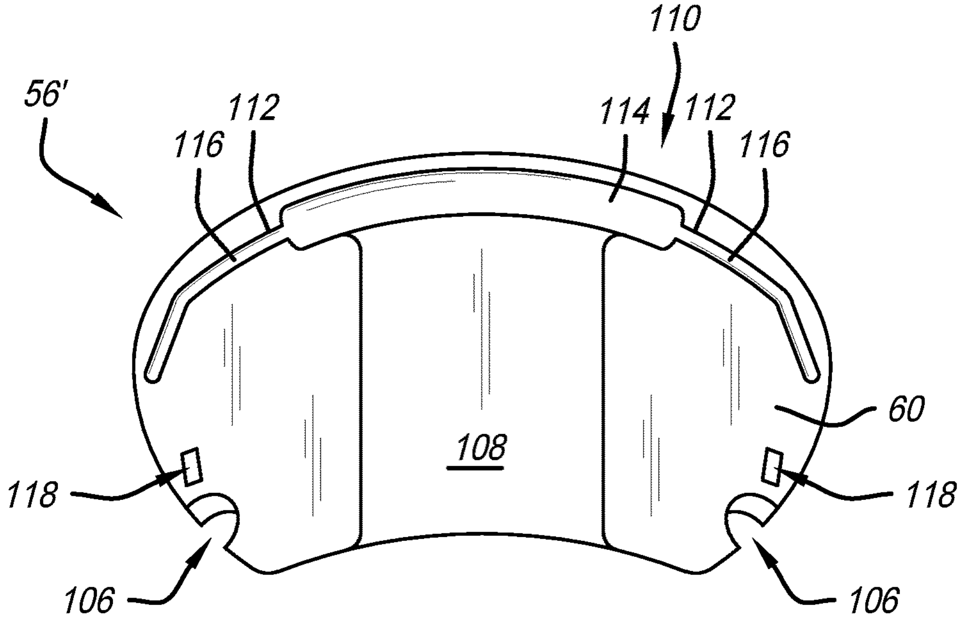
FIG. 14 is a bottom plan view of the alternative breakaway walker tray of FIGS. 11-13, further illustrating the pair of horizontal front tubular grips formed from a bottom surface thereof.

As best illustrated in FIG. 14, a front portion 110 of the breakaway walker tray 56' may also include a generally horizontal front tubular grip 112 that effectively forms a channel and/or indentation therein to accommodate select reception and/or friction fit engagement with the arcuate front support member 102 on opposite sides of the protective sleeve 104. To this end, the horizontal front tubular grip 112 may include a central protective sleeve cutout 114 flanked on each side by a pair of relatively smaller arcuate front support channels 116 (best illustrated in FIG. 14) designed to engage the arcuate front support member 102. Here, the central protective sleeve cutout 114 may simply rest on the protective sleeve 104 to provide forward support thereof or, in alternative embodiments, the central protective sleeve cutout 114 may have a size and shape for select engagement therewith (including, e.g., by way of friction-fit).

Accordingly, the breakaway walker tray 56' may attach to the rolling walker 80 by first engaging the vertical tubular grips 106 with each of the front angled support members 82 (e.g., by friction fit engagement), and then rocking the body 60 of the breakaway walker tray 56' forward until the front portion 110 having the arcuate front support channels 116 engage the respective arcuate front support channels 116. When in this position, the central protective sleeve channel 114 may rest or otherwise engage (e.g., in friction fit engagement) the protective sleeve 104. In the latter embodiment, the vertical tubular grips 106 and/or the horizontal front tubular grip 112 (e.g., including one or both of the central protective sleeve cutout 114 and/or the arcuate front support channels 116) may have a diameter relatively smaller than the respective front angled support member 82, the arcuate front support member 102, and/or the protective sleeve 104 so the material forming the breakaway walker tray 56' may remain in snug friction fit engagement therewith for purposes of removably attaching the breakaway walker tray 56' to the rolling walker 80. Of course, the breakaway walker tray 56' can be easily removed by simply unfastening each of the vertical tubular grips 106 and the horizontal front tubular grip 112 from the front angled support member 82, the arcuate front support member 102, and/or the protective sleeve 104.

Similar to the breakaway walker tray 56 disclosed above with respect to FIGS. 4-7 and 9, the breakaway walker tray 56' also includes the upper edge 66 generally surrounding the recessed top surface 64 to form an enclave therein for retaining spilled food or beverage in the event the breakaway walker tray 56' is not in an ideal horizontal position when attached to the rolling walker 80. In this respect, the breakaway walker tray 56' illustrated in FIGS. 11 and 12 also includes a similar cup holder 68 forming the circular interior 72 for selectively receiving and retaining a cup or other beverage glass or container therein through cooperation of the upper edge 66 and the cup holder edge 70. As discussed above with respect to FIGS. 4-6, the breakaway walker tray 56' may also include the cutout 74 (best shown in FIG. 12) to accommodate a cup handle or the like. Additionally, as best illustrated in FIG. 14, the breakaway walker tray 56' may also optionally include a pair of notches 118 to provide additional engagement with the front angled support member 82.

Figure 15:
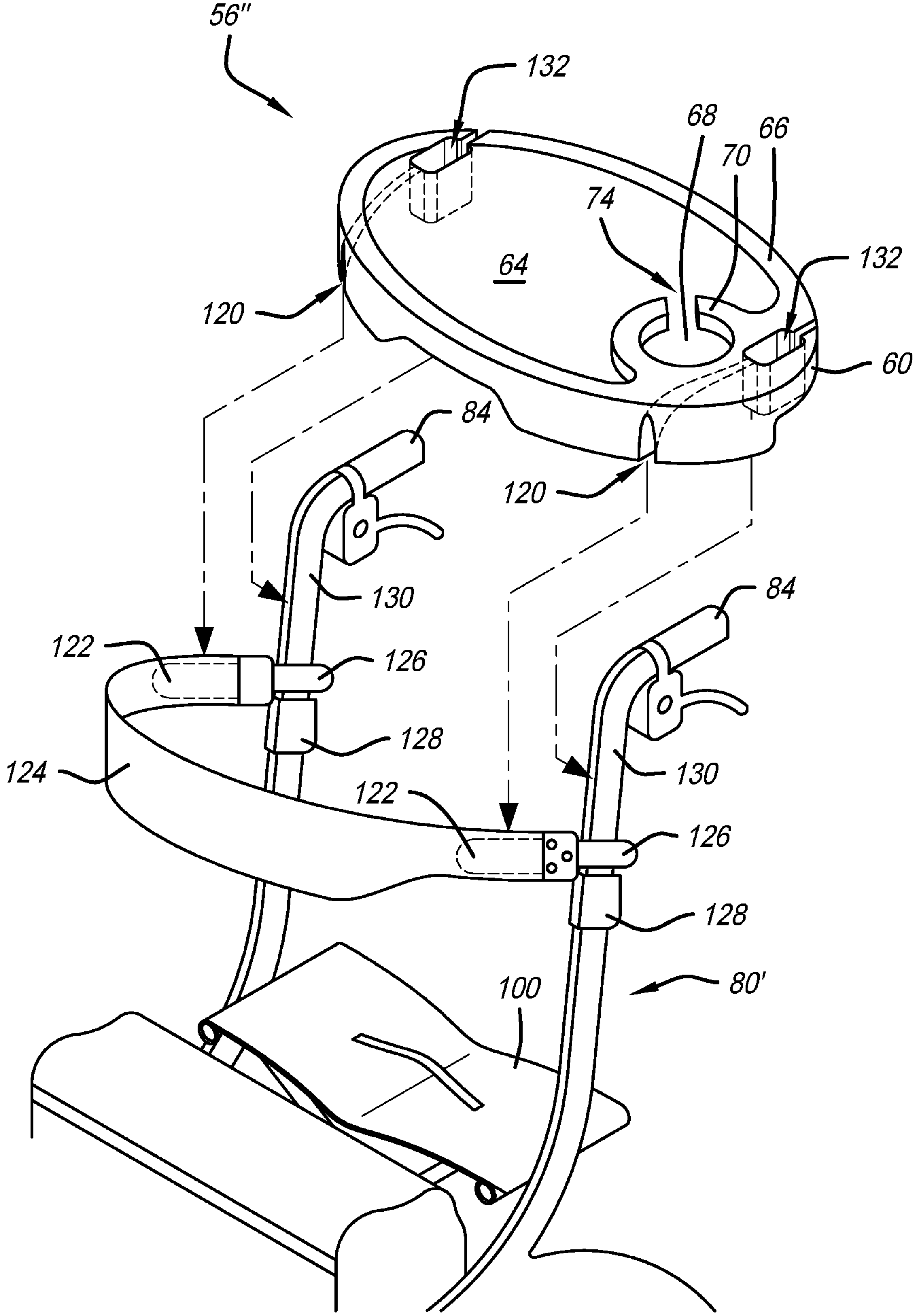
FIG. 15 is a perspective view of an additional alternative breakaway walker tray as disclosed herein having a pair rear vertical block grips and a pair of slotted grip channels respectively engageable with a pair of upright walker arms and a pair of front support brackets of an alternative rolling walker.
Figure 16:
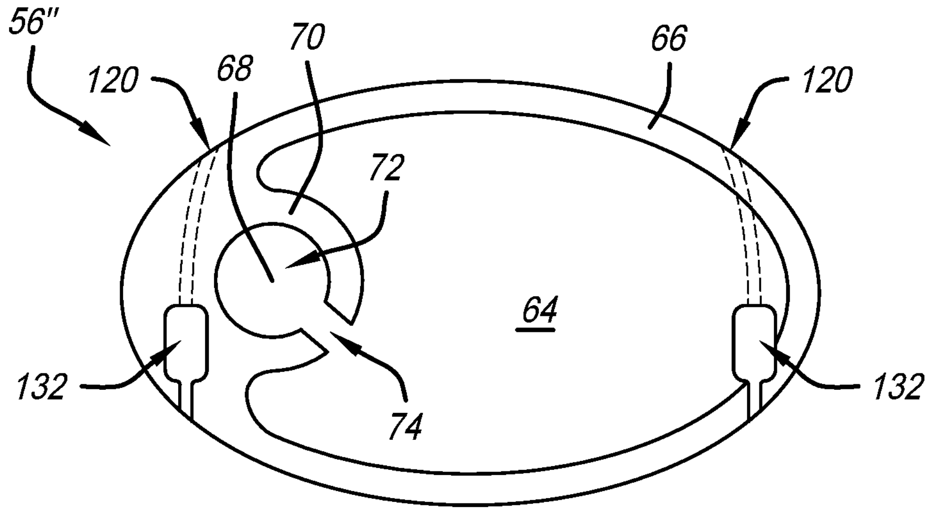
FIG. 16 is a top view of the additional alternative breakaway walker tray of FIG. 15, further illustrating the pair of relatively narrow grip channels relative to a top surface thereof.
Figure 18:
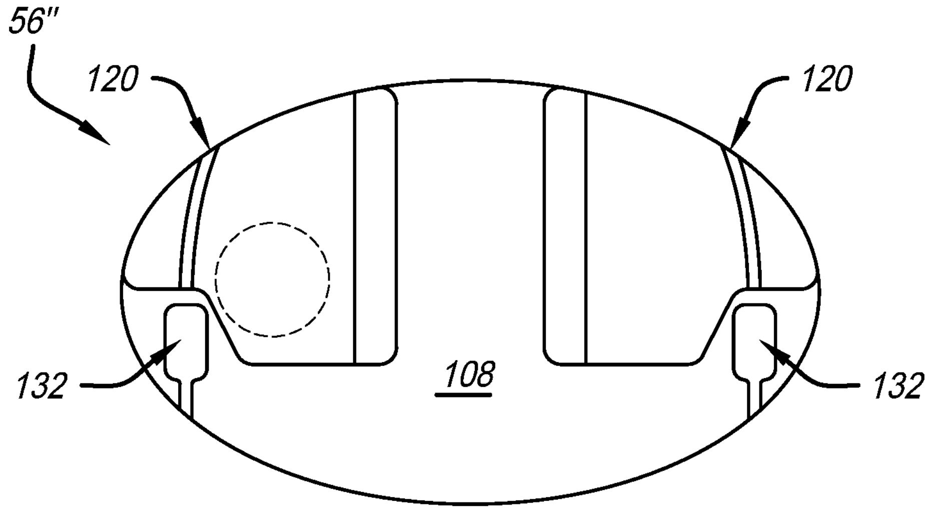
FIG. 18 is a bottom view of the additional alternative breakaway walker tray of FIGS. 15-17, further illustrating the relatively narrow grip channels formed from a bottom surface thereof.

FIG. 15 illustrates another embodiment of an alternative breakaway walker tray 56" for use with an alternative rolling walker 80'. Here, the alternative breakaway walker tray 56" may include a pair of slotted grip channels 120 formed from the body 60 thereof, which may similarly be manufactured from any of the breakaway materials disclosed above. More specifically, the slotted grip channels 120 should have a size and shape for select friction fit attachment with a pair of relatively rigid extensions 122 (e.g., made from a rigid metal material such as steel) that couple with a front strap 124 and otherwise protrude out from a slide bracket 126 that rests on a stop 128 positioned along a height of an upright walker arm 130. As such, FIGS. 15 and 16 illustrate that each of the slotted grip channels 120 extend through the body 60 and form a partial cut-out from the bottom surface 108 (FIG. 18). Moreover, the breakaway walker tray 56" also includes a pair of rear vertical block grips 132 that engage each of the upright walker arms 130 immediately above the slide brackets 126 coupled thereto above the stops 128.

Accordingly, the breakaway walker tray 56" may attach to the rolling walker 80' by first engaging the rear vertical block grips 132 with each of the upright walker arms 130 (e.g., by friction fit engagement), and then further depressing the breakaway walker tray 56" downwardly for engagement of the slotted grip channels 120 with each of the relatively rigid extensions 122. To this end, each of the rear vertical block grips 132 and the slotted grip channels 120 may be of a size relatively smaller than a width of the respective upright walker arms 130 and the extensions 122 wherein the material forming the breakaway walker tray 56" may remain in snug friction fit engagement therewith for purposes of removably attaching the breakaway walker tray 56" to the rolling walker 80'. In alternative embodiments, each of the rear vertical block grips 132 and the slotted grip channels 120 may be of a commensurate size, or slightly larger than, the width of the respective upright walker arms 130 and the extensions 122, wherein the breakaway walker tray 56" may simply slide on to the rolling walker 80'. Removal of the breakaway walker tray 56" may simply require placing an upward force on the bottom surface 108 to disengage each of the rear vertical block grips 132 and the slotted grip channels 120 from the respective upright walker arms 130 and the extensions 122.

Figure 17:
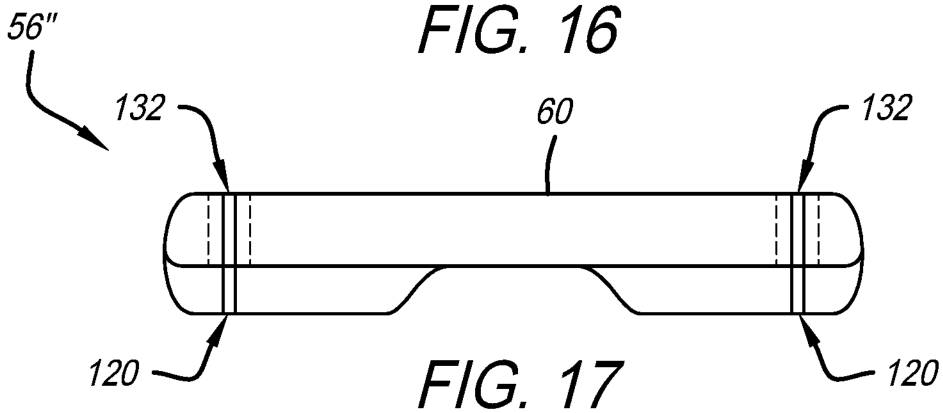
FIG. 17 is a front view of the additional alternative breakaway walker tray of FIGS. 15-16, further illustrating the relatively narrow grip channels extending through the tray body.

FIG. 17 is a front view of the breakaway walker tray 56" further illustrating that each of the slotted grip channels 120 and the rear vertical block grips 132 generally form vertical cutouts from the body 60 of the breakaway walker tray 56". To this end, FIG. 18 further illustrates that each of the slotted grip channels 120 and the rear vertical block grips 132 are formed as cutouts from the bottom surface 108 of the breakaway walker tray 56". In an alternative embodiment, the rear vertical block grips 132 could be formed of a straight channel, i.e., be of a consistent width throughout.

Additionally, and similar to the breakaway walker trays 56, 56' disclosed above with respect to FIGS. 4-7, 9, and 11-14, the breakaway walker tray 56" also includes the upper edge 66 generally surrounding the recessed top surface 64 to form an enclave therein for retaining spilled food or beverage in the event the breakaway walker tray 56" is not in an ideal horizontal position when attached to the rolling walker 80'. In this respect, the breakaway walker tray 56" illustrated in FIGS. 15 and 16 also includes a similar cup holder 68 forming the circular interior 72 for selectively receiving and retaining a cup or other beverage glass therein through cooperation of the upper edge 66 and the cup holder edge 70. As discussed above with respect to FIGS. 4-6 and 12, the breakaway walker tray 56" may also include the cutout 74 to accommodate a cup handle or the like.

Figure 19:
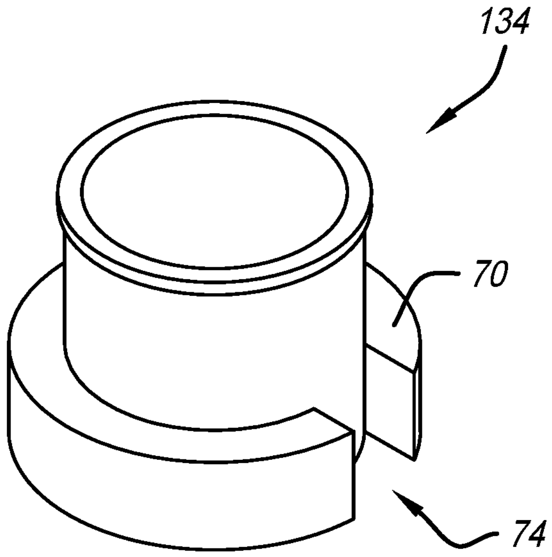
FIG. 19 is a perspective view of a cup holder adapter for use with the breakaway walker trays as disclosed herein.

In one embodiment, the cup holders 68, 68' may be made of a standard size and shape, wherein the dimensions thereof may still vary through use of a compatible cupholder adapter 134, e.g., as illustrated in FIGS. 4 and 19. In one embodiment, the cupholder adapter 134 may have an exterior diameter approximately the same size as the internal diameter of the interior 72 for purposes of establishing a snug friction fit therebetween. In some embodiments, the exterior diameter may be somewhat larger than the interior 72 to better facilitate said friction-fit engagement. This naturally allows the relatively smaller interior diameter of the cupholder adapter 134 to more snugly retain a beverage glass of a relatively smaller diameter, i.e., one that is otherwise too small to snugly fit within the circular interior 72 of the standard size cup holder 68, 68'. Of course, the cupholder adapter 134 may be used with any of the cupholders 68, 68' disclosed with respect to any of the breakaway walker trays 56, 56', 56". The cupholder adapter 134 may also include a cutout commensurate in size and shape with the cutout 74 so that the cupholder adapter 134 is usable with a beverage glass or container having a handle (e.g., a coffee mug). In one embodiment, FIG. 4 illustrates one such cupholder adapter 134 in exploded relation relative to the cupholder 68.

As such, the size and/or shape of the cupholder 68 formed into the breakaway walker tray 56 may be decided by the open interior diameter of the cupholder adapter 134, as opposed to a static size formed by the interior 72 of the cupholder 68, 68'. In other words, thicker cupholder adapters 134 will have a smaller interior diameter (for engagement with relatively smaller diameter containers), while thinner cupholder adapters 134 will have a relatively larger interior diameter (for engagement with relatively larger diameter containers). Generally matching the size of the open interior diameter of the cupholder 68 or the cupholder adapter 134 ensures that the container to be retained therein may engage the cupholder 68 or the cupholder adapter 134 by friction fit engagement.

Figure 20:
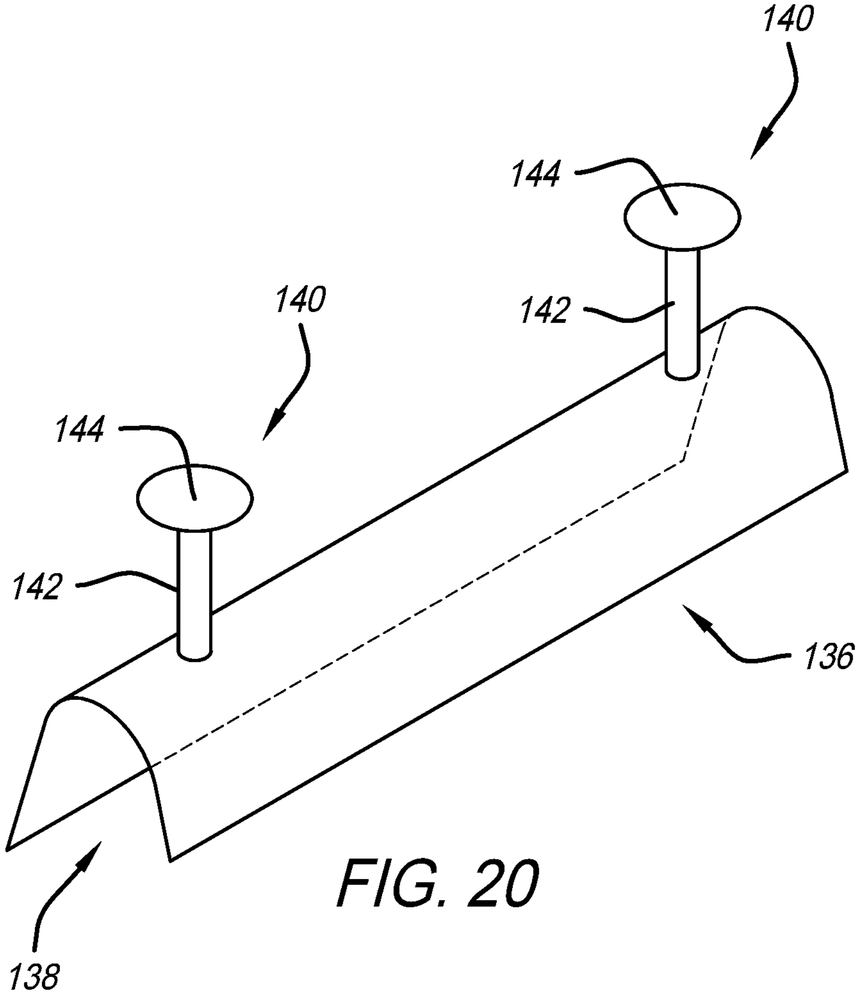
FIG. 20 is a perspective view of an insert for use with the tubular grips of the breakaway walker trays as disclosed herein.

Moreover, each of the grips disclosed herein may be adapted for use with an insert 136, such as the one illustrated with respect to FIG. 20. In one embodiment, the insert 136 may be made from a relatively hard plastic or comparable material and have a channel 138 designed for similar slide-in engagement or friction-fit engagement with any of the aforementioned members of the standard walker 20 or the rolling walkers 80, 80'. In this respect, the relatively harder material of the insert 136 may be more resistant to long-term wear (e.g., relative to a softer material such as EPS) as a result of repeat attachment and/or detachment to and/or from the standard walker 20 and/or the rolling walkers 80, 80', or the like. Moreover, the insert 136 may include one or more anchors 140 that extend out and away from the channel 138 by an extension 142 that terminates in a radially outwardly extending disk 144 having an increased surface area designed to help retain the insert 136 within the body 60 of the breakaway walker tray 56, 56', 56". In other words, the disks 144 help resist pull-out removal of the inserts 136 from the body 60 during removal of the breakaway walker trays 56, 56', 56" from any of the standard walker 20, the rolling walkers 80, 80' or the like.

Figure 21:
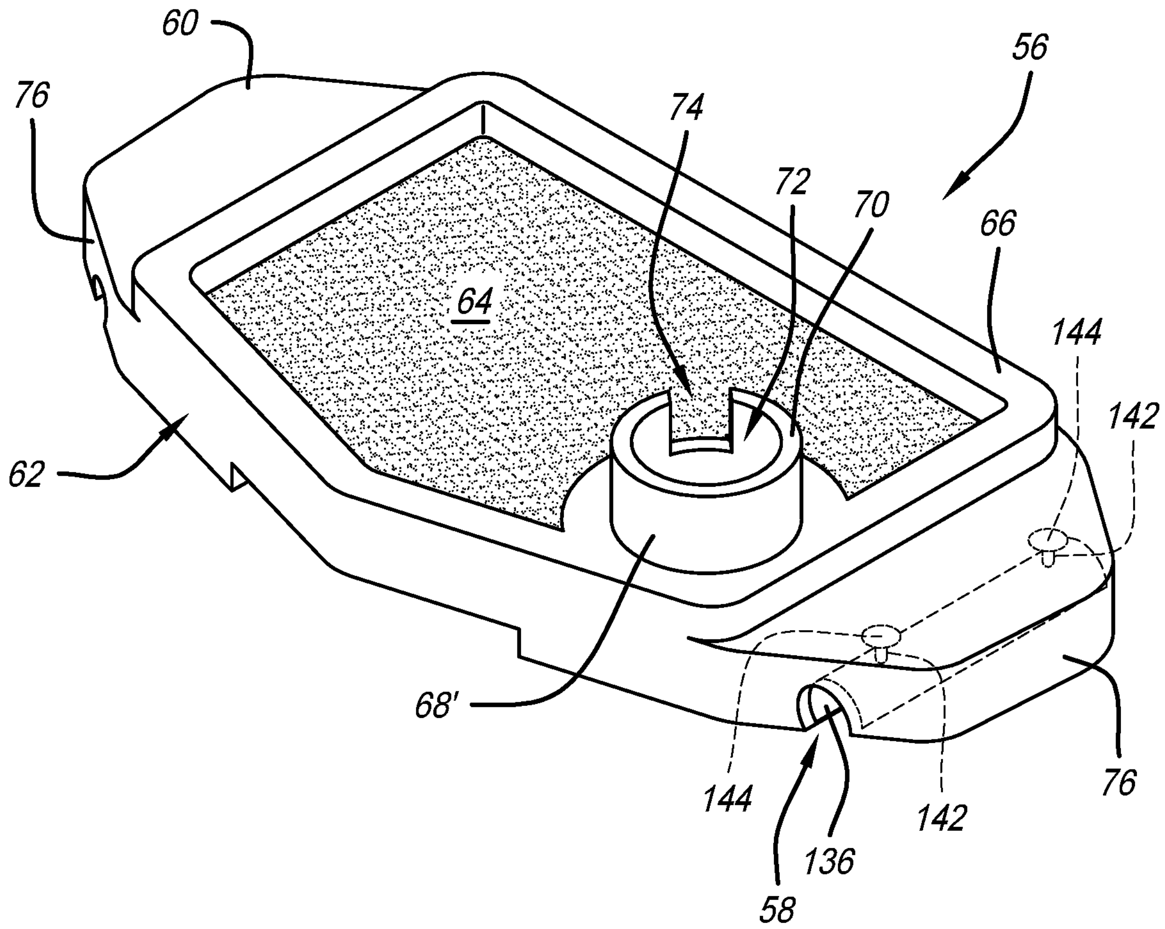
FIG. 21 is a perspective view illustrating the insert of FIG. 20 integrated into the breakaway walker tray of FIG. 5.

Lastly, FIG. 21 is a perspective view illustrating the insert 136 illustrated in FIG. 20 integrated with one of the horizontal tubular grips 58 of the breakaway walker tray 56. More specifically, FIG. 20 illustrates that the size and shape of the insert 136 generally tracks the size and shape of the arcuate cutout forming the horizontal tubular grip 58 for connection to any of the standard walker 20, the rolling walkers 80, 80', or other walkers known in the art, as discussed herein. Moreover, FIG. 21 illustrates that each of the extensions 142 and the disks 144 are buried within the thickness of the material forming the flanges 76. This may be accomplished at the manufacturing stage by forming the flanges 76 around each of the extensions 142 and/or the disks 144 to lock each therein. To this end, the generally enlarged surface area of the disks 144 may be positioned generally parallel to the length of the horizontal tubular grip 58 to generally resist pull-out removal of the insert 136 from the horizontal tubular grip 58, such as when disconnecting the breakaway walker tray 56 from any of the standard walker 20, the rolling walkers 80, 80', or another walker known in the art (especially when in friction-fit engagement therewith). In an alternative embodiment, the disks 144 may protrude from a top surface of the flanges 76 and may threadingly engage the extensions 142. In this embodiment, it may be possible to unthread and remove the disks 144 from the extensions 142, which may permit slide out removal and/or replacement of the insert 136 within the horizontal tubular grip 58.

Although several embodiments have been described in detail for purposes of illustration, various modifications may be made without departing from the scope and spirit of the invention. Accordingly, the invention is not to be limited, except as by the appended claims.

What is claimed is:

1. A breakaway walker tray, comprising:

a body having a thickness between a top surface and a bottom surface, and a pair of distal ends having a continuous downward slope;

a pair of tubular grips extending a width of the body, comprising the same material as the body, and selectively engageable with a pair of supports at least partially defining a frame of a walker, each of the pair of tubular grips are respectively engageable with the pair of supports in substantial engagement therewith along an entire surface area thereof;

wherein the pair of tubular grips breakaway from the pair of supports when under a load of a user falling on the body; and wherein one of the pair of tubular grips is respectively formed from each distal end underneath the continuous downward slope such that the thickness of the body measured between the top surface and the bottom surface varies in a frontal cross-section plane across where each tubular grip is formed from the respective distal end of the body underneath the continuous downward slope.

2. The breakaway walker tray of claim 1, wherein the body includes a pair of angled flanges extending from opposite sides thereof, each of the angled flanges including one of the pair of tubular grips formed therein.

3. The breakaway walker tray of claim 2, wherein each of the pair of tubular grips comprise a generally longitudinal arcuate opening formed from the bottom surface of the body.

4. The breakaway walker tray of claim 1, wherein the pair of tubular grips include an opening smaller than an external diameter of the pair of supports when in a normal relaxed position, the opening enlargeable to at least be commensurate in size with the external diameter of the pair of supports when in a second insertion position permitting slide-in engagement of the pair of supports within the pair of tubular grips, the opening returning to the normal relaxed position after slide-in engagement thereof such that the tubular grips cup the pair of supports therein.

5. The breakaway walker tray of claim 1, wherein the pair of tubular grips include an arcuate opening or a straight opening.

6. The breakaway walker tray of claim 1, wherein the pair of tubular grips comprise a pair of vertical grips formed from an external sidewall of the body and form a partial arcuate cut-out through the thickness thereof.

7. The breakaway walker tray of claim 6, wherein each of the pair of vertical grips taper inwardly from the bottom surface of the body to an upper edge of the body.

8. The breakaway walker tray of claim 1, including a horizontal front tubular grip forming a front longitudinal channel from the bottom surface of the body and having a size and shape to accommodate select friction-fit engagement with an arcuate front support member of the walker.

9. The breakaway walker tray of claim 1, including a pair of notches formed from the body and having a size and shape for select friction-fit engagement with a pair of front angled support members of the walker.

10. The breakaway walker tray of claim 1, including a pair of slotted grip channels having a size and shape for select friction fit engagement with a pair of relatively rigid extensions coupled to a front strap protruding out from a slide bracket resting on a respective stop respectively coupled to the pair of supports.

11. The breakaway walker tray of claim 10, wherein each of the slotted grip channels extend into the body and form a partial cut-out from the bottom surface thereof.

12. The breakaway walker tray of claim 1, wherein the pair of tubular grips permit one step engagement and disengagement of the breakaway walker tray with the frame of the walker.

13. The breakaway walker tray of claim 1, wherein each tubular grip comprises an inverse U-shaped cross-sectional opening extending the width of the body and having an opening relatively larger than a diameter of one of the pair of supports.

14. A breakaway walker tray, comprising:

a body having a planar shape for select reception within a three-sided enclosure defined by a set of support members forming a walker;

a pair of grips formed from the body and having a size and shape for select engagement with a pair of the set of support members of the walker;

an insert having an arcuate configuration tracking a surface area of one of the pair of grips and comprising a material harder than the body; and wherein the body comprises a material having a rigidity maintaining the planar shape of the body when the body spans between the pair of the set of support members when coupled to the walker by the pair of grips, yet being crushable under the weight of a user of the walker.

15. The breakaway walker tray of claim 14, wherein the material is selected from the group consisting of an expanded polystyrene ("EPS") material, a Styrofoam material, a molded fiber material, a molded pulp material, an egg-carton material, a cardboard material, a material blended from fiberglass and cardboard, a relatively soft fiberglass, a molded fabric material, and a papier-mâché material.

16. The breakaway walker tray of claim 14, wherein the body includes an upstanding outer edge generally encompassing a recessed top surface positioned to an interior of the upstanding outer edge.

17. The breakaway walker tray of claim 16, wherein the recessed top surface includes a selectively removable surface covering comprising a non-slip material.

18. The breakaway walker tray of claim 16, including a cupholder formed at least in part from a portion of the upstanding outer edge and at least in part from a cupholder edge projecting inwardly therefrom and into an area of the recessed top surface.

19. The breakaway walker tray of claim 18, including an adapter having an external diameter approximately the same size as an internal diameter of the cupholder for slide-fit engagement therewith.

20. The breakaway walker tray of claim 16, including a cupholder positioned to an interior of the upstanding outer edge and including a cutout for accommodating an outwardly extending handle of a container retainable therein.

21. The breakaway walker tray of claim 20, wherein the cutout is flush with the recessed top surface.

22. The breakaway walker tray of claim 14, wherein the insert includes an outwardly extending anchor terminating in a radially outwardly extending disk having an increased surface area permitting select engagement with the body along the respective grip.

23. The breakaway walker tray of claim 14, wherein the pair of grips permit one step engagement and disengagement of the breakaway walker tray with the frame of the walker.

24. A breakaway walker tray, comprising:

a body defining a planar surface;

a pair of tubular grips formed from a portion of the body and selectively engageable with a pair of supports at least partially defining a frame of a walker, each of the pair of tubular grips are respectively engageable with the pair of supports in substantial engagement therewith along an entire surface area thereof, wherein the pair of tubular grips breakaway from the pair of supports when under a load of a user falling on the body; and a pair of rear vertical block grips extending through a thickness of the body and intersecting the pair of tubular grips comprising a pair of slotted channels in a bottom surface of the body, the pair of rear vertical block grips and the pair of slotted channels are each respectively engageable with a pair of upright walker arms and a pair of front support brackets of the walker.

25. A breakaway walker tray, comprising:

a body defining a planar surface;

a pair of tubular grips formed from a portion of the body and selectively engageable with a pair of supports at least partially defining a frame of a walker, each of the pair of tubular grips are respectively engageable with the pair of supports in substantial engagement therewith along an entire surface area thereof, wherein the pair of tubular grips breakaway from the pair of supports when under a load of a user falling on the body; and a horizontal front tubular grip comprising a front longitudinal channel from a bottom surface of the body in the form of a central protective sleeve cutout flanked on each side by a pair of smaller arcuate front support channels, the horizontal front tubular grip being of a size and shape to accommodate select friction-fit engagement with an arcuate front support member of the walker.

26. A breakaway walker tray, comprising:

a body defining a planar surface;

a pair of tubular grips formed from a portion of the body and selectively engageable with a pair of supports at least partially defining a frame of a walker, each of the pair of tubular grips are respectively engageable with the pair of supports in substantial engagement therewith along an entire surface area thereof, wherein the pair of tubular grips breakaway from the pair of supports when under a load of a user falling on the body; and an insert having a generally arcuate configuration tracking a surface area of one of the pair of tubular grips and comprising a material relatively harder than the body.

27. The breakaway walker tray of claim 26, wherein the insert includes an outwardly extending anchor terminating in a radially outwardly extending disk having an increased surface area permitting select engagement with the body along the respective tubular grip.

* * * * *